US012576795B2

(12) United States Patent
Chamberlain et al.

(10) Patent No.: US 12,576,795 B2
(45) Date of Patent: Mar. 17, 2026

(54) VEHICLE SEATING ASSEMBLY HAVING A SEAT BACK WITH AN ATTACHABLE MODULAR ACCESSORY

(71) Applicant: Ford Global Technologies, LLC, Dearborn, MI (US)

(72) Inventors: Spencer Chamberlain, Oxford, MI (US); Harry Delarosa Bernardo, Irvine, CA (US); Michael John Harmon, Northville, MI (US); Raul Cenan, Marina Del Ray, CA (US); Leeyul Jeraffi, Laguna Niguel, CA (US); Bradford Zercoe, San Jose, CA (US); Eva Ross, Venice, CA (US); Kevin Mozurkewich, Milford, MI (US); Jerry Wei Hua Yao, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 18/496,992

(22) Filed: Oct. 30, 2023

(65) Prior Publication Data

US 2025/0136014 A1 May 1, 2025

(51) Int. Cl.
*B60R 11/00* (2006.01)
*B60N 2/30* (2006.01)

(52) U.S. Cl.
CPC ............ *B60R 11/00* (2013.01); *B60N 2/3045* (2013.01); *B60R 2011/0015* (2013.01); *B60R 2011/0071* (2013.01)

(58) Field of Classification Search
CPC . B60R 11/00; B60R 11/02; B60R 2011/0015; B60R 2011/0017; B60N 2/3045
See application file for complete search history.

(56) References Cited

U.S. PATENT DOCUMENTS

| | | | |
|---|---|---|---|
| 4,668,010 A | 5/1987 | Fujiwara | |
| 6,338,518 B1 | 1/2002 | D'Annunzio et al. | |
| 6,488,327 B1 | 12/2002 | Pearse et al. | |
| 6,702,375 B1 | 3/2004 | Laskowski et al. | |
| 9,695,972 B1 * | 7/2017 | Jiang .................... | F16M 11/041 |
| 11,376,995 B1 * | 7/2022 | Jaranson ............ | B60N 2/02258 |
| 11,390,219 B2 * | 7/2022 | Harmon ................. | B60R 11/00 |
| 11,541,784 B2 * | 1/2023 | Powell ..................... | B60N 2/32 |
| 2005/0161480 A1 | 7/2005 | Tirey | |
| 2005/0248189 A1 | 11/2005 | Prasatek et al. | |

(Continued)

FOREIGN PATENT DOCUMENTS

EP 3705346 A1 9/2020

*Primary Examiner* — Brian D Nash
(74) *Attorney, Agent, or Firm* — Vichit Chea; Price Heneveld LLP

(57) ABSTRACT

A vehicle seating assembly comprises a seat base, a seat back, an articulation mechanism coupled to the seat base and seat back to allow the seat back to move between an upright seating position and a folded position, a back panel provided on the seat back, an accessory attachment system located on the back panel and having one or more alignment connector structures and one or more latches, and an accessory configured to connect onto the back panel and engage the one or more alignment connectors and the one or more latches.

15 Claims, 12 Drawing Sheets

(56) References Cited

U.S. PATENT DOCUMENTS

| | | | | |
|---|---|---|---|---|
| 2009/0089841 A1* | 4/2009 | Hanlon | .............. | B60R 11/0235 |
| | | | | 725/75 |
| 2012/0241572 A1* | 9/2012 | McClain | ........... | B64D 11/0638 |
| | | | | 248/220.21 |
| 2014/0306479 A1* | 10/2014 | Abe | .................... | B60N 2/3013 |
| | | | | 296/65.09 |
| 2014/0319885 A1 | 10/2014 | Rouxel et al. | | |
| 2017/0305354 A1* | 10/2017 | Kang | .................... | F16M 11/26 |
| 2018/0251050 A1* | 9/2018 | Damerow | ................ | B60N 2/20 |
| 2019/0077330 A1 | 3/2019 | Michalak et al. | | |
| 2019/0225131 A1* | 7/2019 | Bellamy | ................ | B60N 3/004 |
| 2019/0283644 A1* | 9/2019 | Smith | ................... | B60N 3/102 |
| 2022/0289086 A1* | 9/2022 | Line | .................... | B60N 2/3013 |
| 2023/0219467 A1* | 7/2023 | Sahi | .................... | B60N 2/3011 |
| | | | | 296/65.09 |
| 2024/0149755 A1* | 5/2024 | Susko | ................... | B60N 2/986 |
| 2024/0391363 A1* | 11/2024 | Salter | .................. | B60N 2/3011 |

* cited by examiner

VEHICLE SEATING ASSEMBLY HAVING A SEAT BACK WITH AN ATTACHABLE MODULAR ACCESSORY

FIELD OF THE DISCLOSURE

The present disclosure generally relates to vehicle seating, and more specifically relates to a modular seat back configured to hold one or more accessories on a vehicle.

BACKGROUND OF THE DISCLOSURE

Motor vehicles are commonly equipped with vehicle seating assemblies typically having a seat base and seat back. Some seating assemblies may allow for accessories to be attached to the back of the seat back. It would be desirable to provide for a vehicle seating assembly having a seat back with a modular connector assembly for use with various accessories on a motor vehicle.

SUMMARY OF THE DISCLOSURE

According to a first aspect of the present disclosure, a vehicle seating assembly comprises a seat base, a seat back, an articulation mechanism coupled to the seat base and seat back to allow the seat back to move between an upright seating position and a folded position, a back panel provided on the seat back, an accessory attachment system located on the back panel and having one or more alignment connector structures and one or more latch retainers, and an accessory configured to connect onto the back panel and engage the one or more alignment connectors and the one or more latch retainers.

Embodiments of the first aspect of the present disclosure can include any one or a combination of the following features:

- the one or more latch retainers comprise one or more latches;
- the one or more latches comprises first and second latches;
- the accessory comprises one or more strikers configured to engage the one or more latches;
- the alignment connector comprises first and second toe-in alignment arms configured to engage first and second slots;
- the seating assembly is a passenger seating assembly;
- the accessory comprises a deployable crate;
- the accessory comprises a changing table;
- the accessory comprises a deployable table assembly;
- the accessory comprises a media accessory;
- the accessory comprises one of a cargo and playzone accessory; and
- the accessory comprises a pet divider.

According to a second aspect of the present disclosure, a vehicle seating assembly comprises a seat base, a seat back, an articulation mechanism coupled to the seat base and seat back to allow the seat back to move between an upright seating position and a folded position, a back panel provided on the seat back, an accessory attachment system located on the back panel and having one or more alignment connector structures and one or more latches, and an accessory configured to connect onto the back panel and engage the one or more alignment connector structures and one or more latches, wherein one of the accessory attachment system and the accessory has first and second latches and the other of the accessory attachment system and the accessory has first and second strikers.

Embodiments of the second aspect of the present disclosure can include any one or a combination of the following features:

- the accessory attachment system has the first and second latches and the back panel has the first and second strikers;
- the accessory comprises a deployable crate;
- the accessory comprises a changing table;
- the accessory comprises a deployable table assembly;
- the accessory comprises a media accessory;
- the accessory comprises one of a cargo and playzone accessory; and
- the accessory comprises a pet divider.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
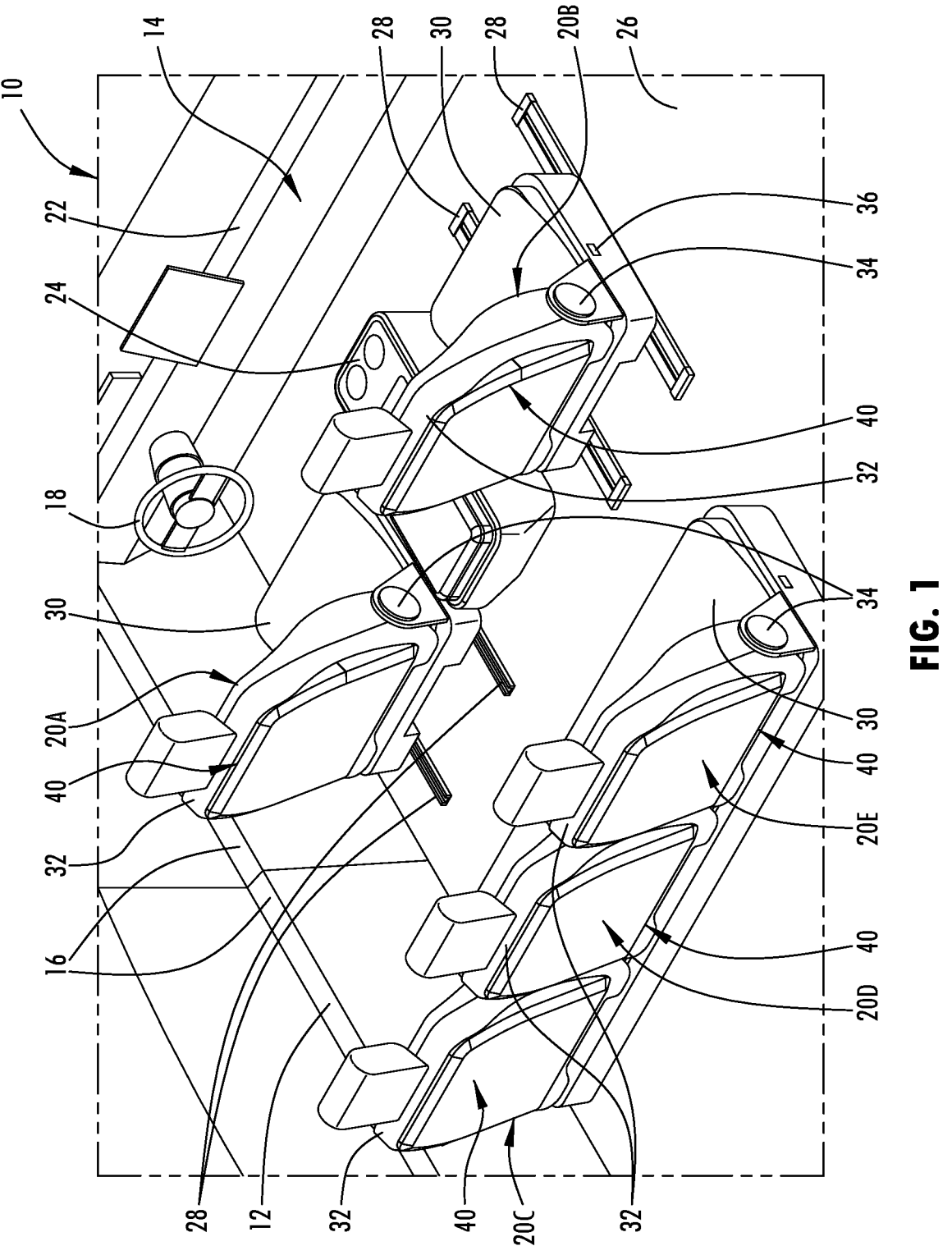
FIG. 1 is an elevated rear perspective view of a cabin interior of a motor vehicle having seating assemblies with an accessory on each seat back, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly having a modular accessory connected to the seat back. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating for transporting one or more passengers including a driver and passengers of the vehicle 10 and for further transporting one or more items onboard the vehicle 10. The motor vehicle 10 has a vehicle body 12 that generally defines a cabin interior 14. The cabin interior 14 may contain various features and trim components. The cabin interior 14 is shown having an arrangement of front row passenger seats including a first seating assembly 20A configured to seat a driver and a second seating assembly 20B configured to seat a passenger. The first and second seating assemblies 20A and 20B may be configured as captain seats, for example, laterally spaced apart and separated by space that includes a front center console 24 that may be configured in various shapes and sizes. The motor vehicle 10 illustrated in one example also has additional seating such as a second row of seating including third, fourth, and fifth seating assemblies 20C, 20D, and 20E that may be configured with modular accessories according to the various embodiments shown and described herein, and additional rows of seating. The motor vehicle 10 may include additional seating as is common for a large van or bus. It should be appreciated that the vehicle 10 may be a motor vehicle, such as a wheeled car, truck, SUV, van or bus, for example, or an airplane, train, boat or other vehicle capable of transporting one or more passengers and items.

The motor vehicle 10 is illustrated with a front row of seating having the first seating assembly 20A located on one lateral side (e.g., the left side) of the first row and vehicle rearward of a dashboard 22 and a steering wheel 18 and configured for seating a driver of the vehicle 10. The first seating assembly 20A includes a seat base 30 and a seat back 32. The second seating assembly 20B is shown positioned vehicle rearward of the dashboard 22 on the opposite lateral side (e.g., right side) of the front row of seating and has a seat base 30 and a seat back 32 configured for seating a passenger. The vehicle body 12 has a plurality of side doors 16 that allow the driver and passengers to enter and exit the cabin interior 14 to access the seating assemblies 20A-20E. In the example shown, the first seating assembly 20A is located adjacent to a lateral left side driver door and the passenger second seating assembly 20B is located adjacent to an opposite lateral right side passenger door. Passengers may gain access to or exit from the second and third rows of seating assemblies 20C-20E via the rear side doors 16.

The cabin interior 14 is shown equipped with a front center console 24 located in the space between the first seating assembly 20A and the second seating assembly 20B in the front first row of seating. It should be appreciated that the center console 24 and other consoles may be located at various locations within the vehicle 10, such as between other adjacent seating assemblies.

The cabin interior 14 further includes a second row of seating located rearward of the first row of seating. The second row of seating includes a third seating assembly 20C generally located behind the first seating assembly 20A, a fourth seating assembly 20D located generally behind the center console 24, and a fifth seating assembly 20E generally located behind the second seating assembly 20B. As such, the fourth seating assembly 20D is located between the third and fifth seating assemblies 20C and 20E within the second row of seating. It should be further appreciated that the motor vehicle 10 may include additional seats, such as additional rows of seating as is particularly common in large SUVs, buses, and other large passenger vehicle compartments.

The seating assemblies 20A-20E each include a seat base 30 pivotally connected to a seat back 32 via a pivot or articulation mechanism 34. The articulation mechanism 34 allows the seat back 32 to pivot between an upstanding generally vertical "seating position" and a folded forward downward substantially horizontal position referred to as the "folded position." The articulation mechanism 34 may allow the seat to move to any intermediate seat position and to further recline to a rearward recline position. The seating assembly also includes a seat fold lever 36 that allows a user to unlatch and reposition the orientation of the seat back 32. It should further be appreciated that the seat back 32 may pivot relative to the seat base 30 via an actuator, such as an electric motor which may be actuated in response to a user input. The seat base 30 is shown located on top of a track assembly 28 which allows the seating assembly to move along a longitudinal axis of the vehicle 10 between a forwardmost position and a rearwardmost position. The track assembly 28 may include a track and a rail assembly having a pair of parallel tracks, for example.

Each of the seating assemblies 20A-20E are shown configured with a modular seat back arrangement that includes a seat back accessory 40 that is attachable to the rear side of the seat back 32 as seen in FIG. 1. The modular seat back accessory 40 may be selected from a plurality of available seat accessories and may be removed and is replaceable with another seat back accessory. For example, a first seat back accessory 40 may be connected to the rear side of seat back 32 and may be disconnected therefrom and replaced with a new seat back accessory which may be connected as described herein.

Figure 2:
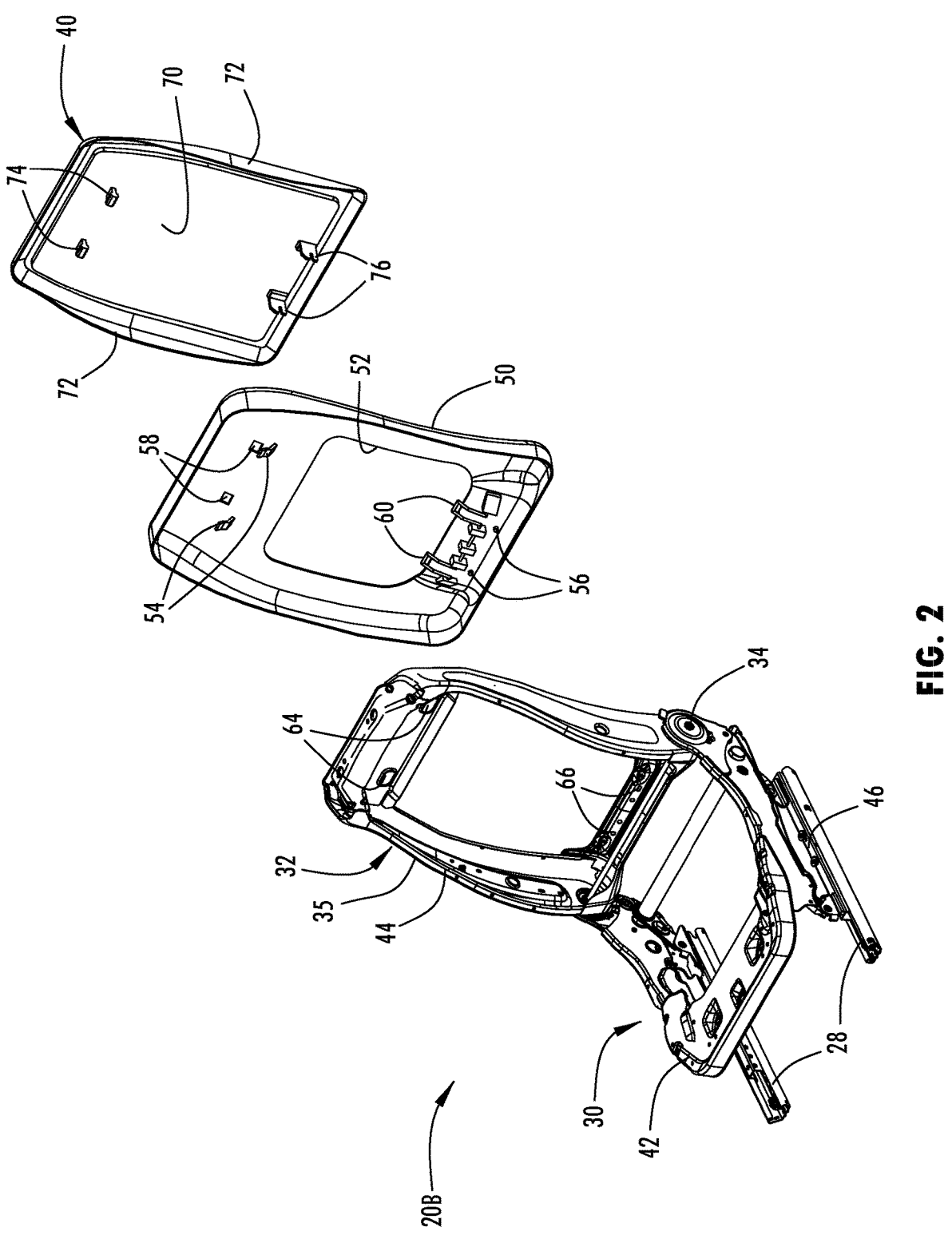
FIG. 2 is an exploded view of one of the seating assemblies illustrating a connector assembly for connecting the accessory onto the seat back, according to a first embodiment.

Referring to FIG. 2, one of the seating assemblies 20B is illustrated with an accessory 40 connected to the seating assembly 20B via a connection assembly, according to a first embodiment. The seating assembly 20B includes a seat frame 42 as part of the seat base 30 and a seat back frame 35 as part of the seat back 32. The seat frame 42 and seat back frame 35 may be made of a metal, for example. The seating assembly 20B further includes a back panel 50 which is assembled onto the rear side of the seat back frame 35. The back panel 50 may be a molded assembly, such as a polymeric-molded panel. The back panel 50 includes a pair of molded location retention features 54 on the forward-facing side that are configured to be inserted into a pair of slots 64 in the seat back frame 35 to properly position the back panel 50 on the seat back frame 35 during assembly. In addition, a pair of fasteners 56, e.g., screws or bolts, are located on the bottom end of the back panel 50 and oriented to engage threaded holes 66 in the lower portion of the seat back frame 35. Accordingly, the back panel 50 may be aligned and installed onto the rear portion of the seat back frame 35 and fastened via fasteners 56 to maintain the back panel 50 in place on the seat back frame 35.

The back panel 50 has a pair of rectangular slots 58 formed in an upper portion of the back panel 50 and first and second strikers 60 provided on a lower portion thereof. The first and second strikers 60 are provided in a region generally overlapping a lower portion of an opening 52 provided in the back panel 50. As such, the first and second strikers 60 are exposed to the opening 52 and may be received by and engaged with corresponding first and second latches 76 on the accessory 40. Each latch 76 may include a stopper arm that is angled and spring biased to receive the corresponding striker 60. The first and second strikers 60 may be configured as bent bars, each having a rod-shaped engagement portion configured to matingly connect with a corresponding latch to retain the accessory 40 on the back panel 50.

The accessory 40 is shown having a forward-facing inner wall 70 and sidewalls 72. The accessory 40 further includes first and second molded locator retention features 74 provided in an upper portion of the inner wall 70. The first and second molded locator retention features 74 are shaped to engage first and second slots 58 in the back panel 50 when tilted and inserted at an inclined angle such as 10-45 degrees, for example. The molded locator retention features may be configured as toe-in alignment arms. Provided at a lower end of the accessory 40 are the first and second latches 76. The first and second latches 76 are configured to receive the first and second strikers 60 provided in the back panel 50 to lock onto and retain the accessory 40 on the back panel 50. Accordingly, a user may attach the accessory 40 onto the back panel 50 by inserting the first and second molded locator retention features 74 into the corresponding first and second slots 58 at an angle and rotating the accessory 40 bottom end downward so that the first and second latches 76 engage the first and second strikers 60 to lock the accessory 40 in place on the back panel 50. It should be appreciated that the first and second latches 76 may be unlatched by applying a rearward force to the bottom end of the accessory 40 so as to unlatch and remove the accessory 40 from the back panel 50.

Figure 3B:
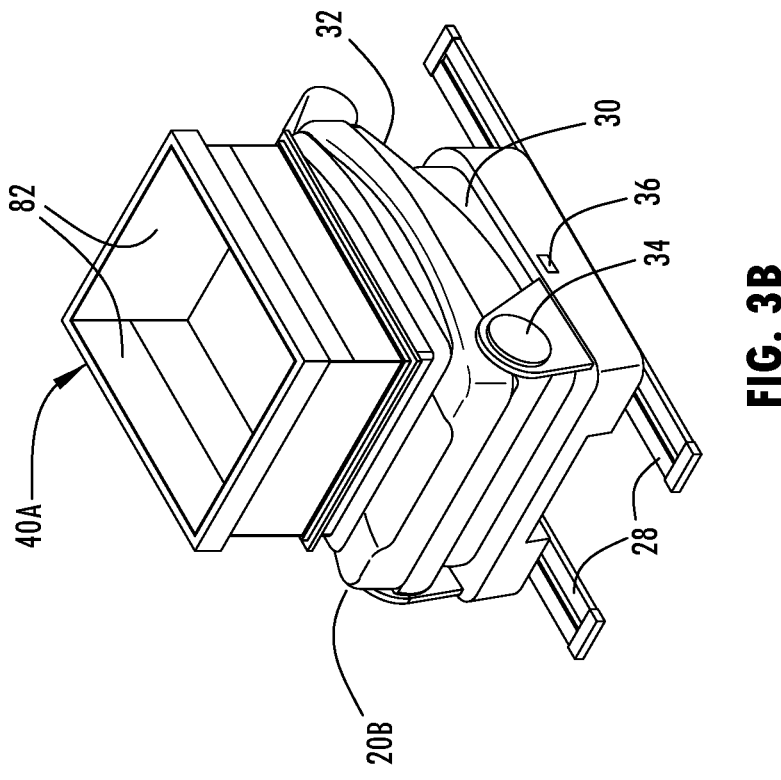
FIG. 3B is a rear perspective view of the seating assembly shown in FIG. 3A with the crate accessory shown in a deployed position.
Figure 3A:
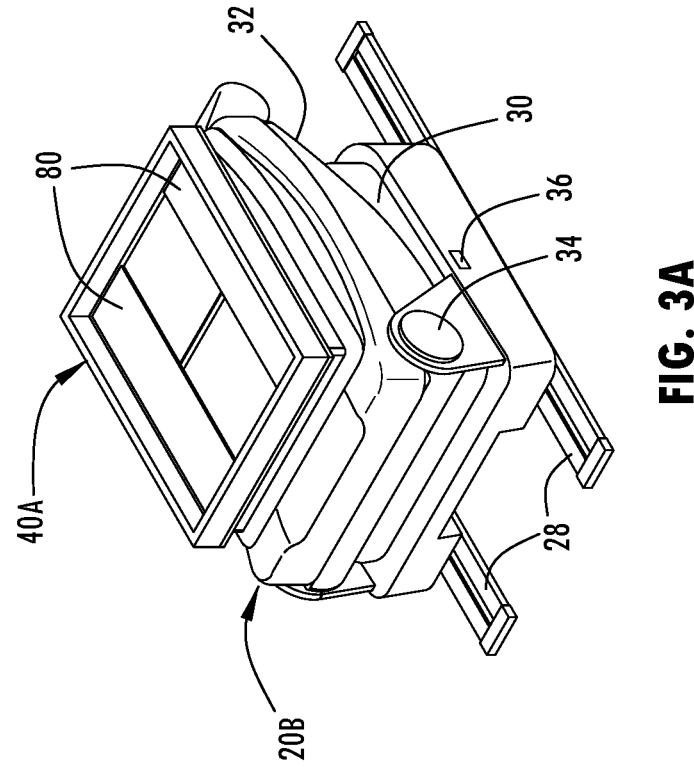
FIG. 3A is a rear perspective view of a seating assembly in a forward-folded position with a crate accessory connected to the seat back shown in a stowed position.

The seating assembly 20B advantageously is modular in that the accessory 40 connected to the rear side of the seat back 32 may be installed and removed and replaced with another accessory. Referring to FIGS. 3A and 3B, a first accessory 40A is illustrated connected to the back side of the seat back 32 which is shown oriented on a top side of the seat back 32 when the seat back 32 is in a folded position which orients the seat back 32 in a generally horizontal arrangement. The first accessory 40A shown in this example is a deployable crate accessory that forms a container and includes a plurality of folded panels 80 that may be compactly folded when not in use. When the deployable crate is desired for use, the folded panels 80 may be unfolded to a constructed position to provide upstanding walls 82 as shown in FIG. 3B. As such, a deployable crate forming a storage container may be provided on the seat back 32.

Figure 4B:
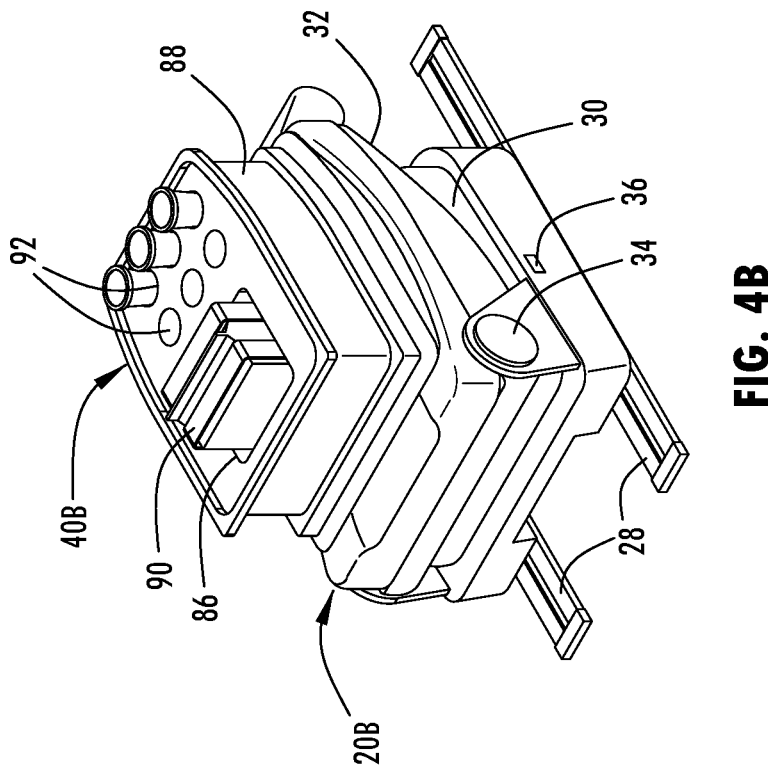
FIG. 4B is a rear perspective view of the seating assembly with the tray accessory shown in a deployed position.
Figure 4A:
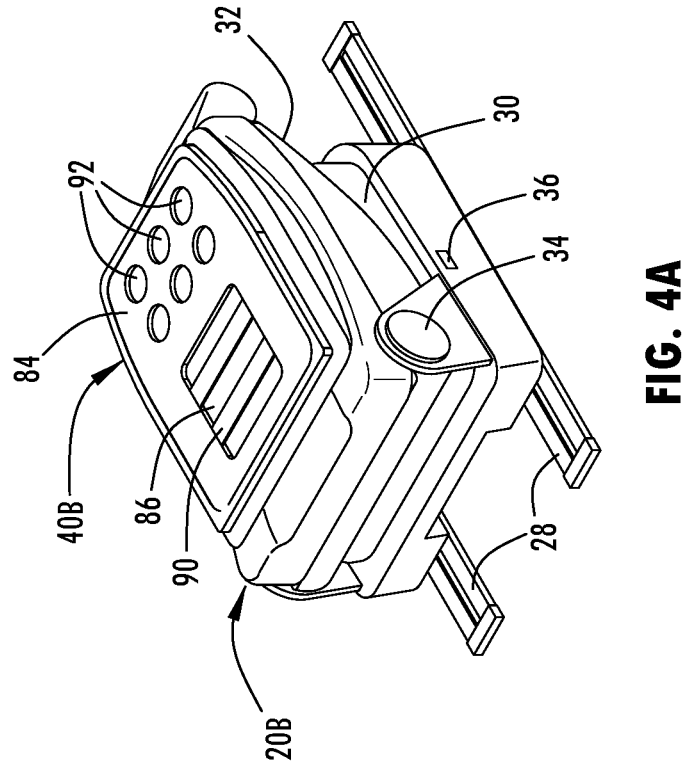
FIG. 4A is a rear perspective view of the seating assembly in the folded position with a tray accessory connected to the seat back shown in a stowed position.

Referring to FIGS. 4A and 4B, an example of a second accessory in the form of a deployable tray accessory 40B is illustrated. The deployable tray accessory 40B is shown in FIG. 4A in a stowed position on the back side of the seat back 32 while the seat back 32 is in the folded position. The deployable tray accessory 40B generally includes a foldable tray body 84 and walls 86 that are folded flat in the compact stowed position. The foldable tray body 84 has a console opening 90 and a plurality of cupholder openings 92 generally shown in the stowed position in FIG. 4A. When deployed, the deployable tray accessory 40B is raised up such that the folded walls 86 move to upstanding positions providing upstanding walls 88. In this deployed position, the opening 90 expands into a storage compartment for receiving items, such as books, as shown. In addition, the cupholders 92 move during deployment to an open position having a depth for receiving drink containers, as shown.

Figure 5:
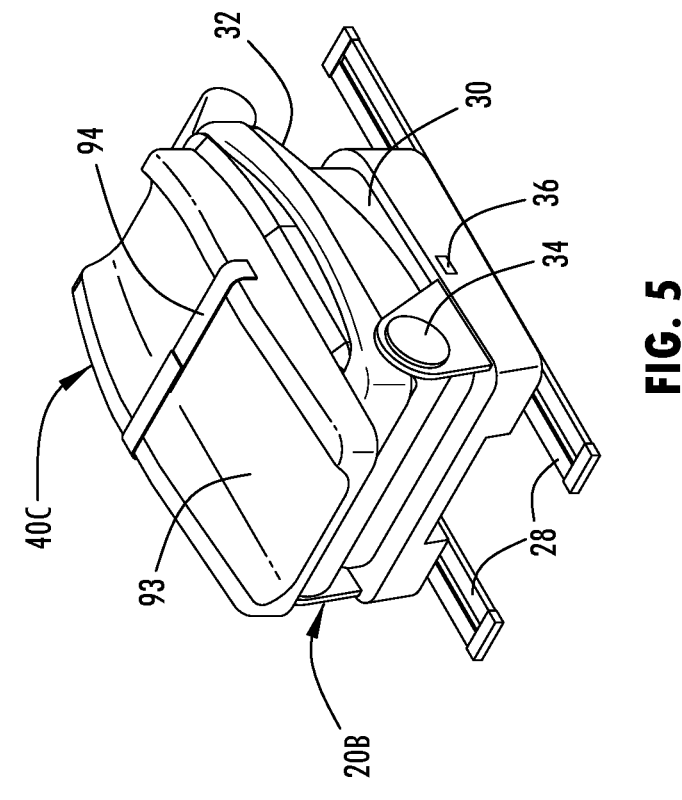
FIG. 5 is a rear perspective view of the seating assembly in the folded position with a changing table accessory connected to the seat back.

Referring to FIG. 5, a third accessory in the form of a changing table accessory 40C is illustrated, according to another example. The changing table accessory 40C generally includes sidewalls and a bottom surface configured to enable changing clothing, such as a diaper on a baby. In addition, a retainer strap 94 extends across the upper portion of the sidewalls of the changing table accessory 40C to help position and retain one or more items on the table. The changing table accessory 40C is useable when the seat back 32 is in the folded forward position, as shown in FIG. 5.

Figure 6:
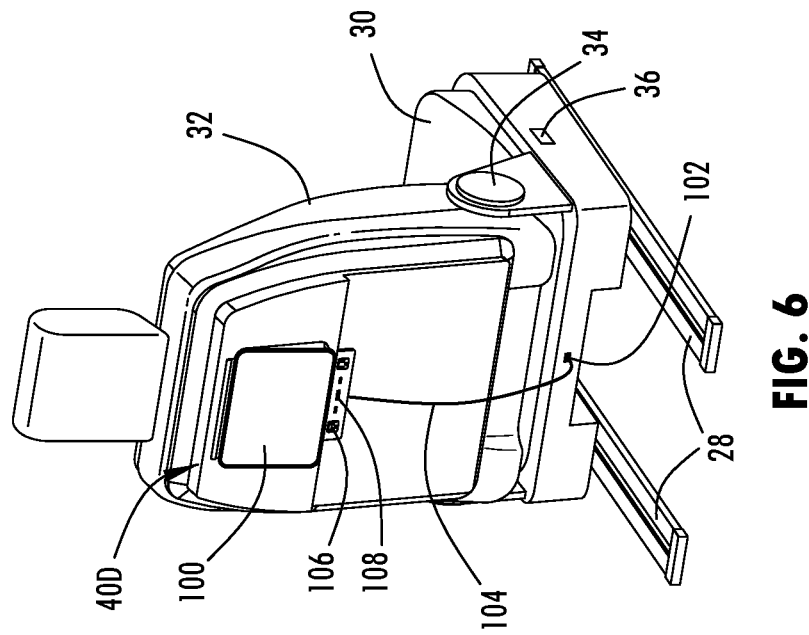
FIG. 6 is a rear perspective view of the seating assembly in a seating position with a media accessory connected to the seat back.

Referring to FIG. 6, a fourth accessory in the form of a media accessory 40D is illustrated, according to a further example. The media accessory 40D is configured to include a touch screen display 100 and a plurality of electronic ports, including power ports 106 and data communication ports

108. The data and power ports 108, 106 may be integrated for supplying data and power via a combined port, such as a USB port, for example. In addition, a further communication port 102 is shown provided in the seat base 30 to provide power and data from the motor vehicle 10 to the media accessory 40D. As such, the user may utilize the media accessory 40D particularly when the seat back 32 is in the upright position for viewing by passengers in seating areas located behind the seating assembly 20B.

Figures 7A, 7B, 7C, 7D:
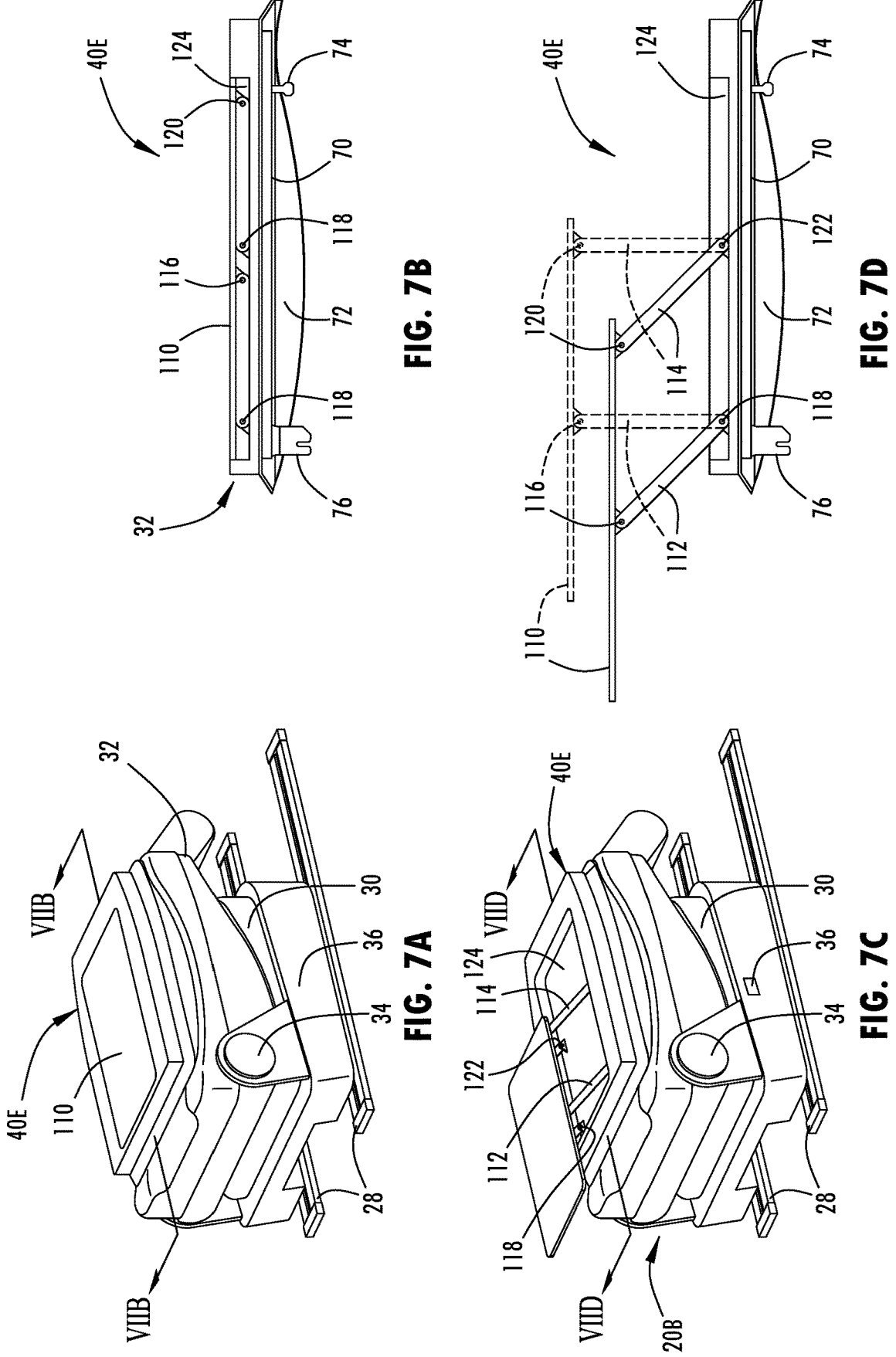
FIG. 7A is a rear perspective view of the seating assembly in the folded position with a deployable table accessory connected to the seat back in a stowed position.
FIG. 7B is a cross-sectional side view taken through line VIIB-VIIB of FIG. 7A showing the deployable table accessory in FIG. 7A in the stowed position.
FIG. 7C is a rear perspective view of the seating assembly shown in FIG. 7A with the deployable table accessory shown in a deployed position.
FIG. 7D is a cross-sectional view taken through line VIID-VIID in FIG. 7C showing the deployable table accessory in the deployed position.

Referring to FIGS. 7A-7D, a fifth accessory in the form of a deployable table accessory 40E is illustrated, according to a further example. The deployable table accessory 40E is shown being deployable for use when the seat back 32 is in the folded forward position. As seen in FIGS. 7A and 7B, the deployable table accessory 40E has a top table 110 shown in a folded or stowed position that compactly fits within a recessed area 124 in the rear surface of the seat back 32. In this position, the deployable table accessory 40E may be useable in the stowed position at a lower elevation. The deployable table accessory 40E may be deployed to an extended position as shown in FIGS. 7C and 7D. In doing so, the table 110 of the deployable table accessory 40E extends upward and rearward from the stowed position to the elevated use position. To enable this movement to occur, the table 110 is connected on opposite lateral sides to first and second arms 112 and 114 on each of the left and right sides of the table 110. The first arm 112 is connected to the table 110 via a first pivot pin 116 and is connected to a support on the bottom side via a second pivot pin 118. Similarly, the second arm 114 is connected to the table 110 via a third pivot pin 120 on the top side and to a fourth pivot pin 122 on the bottom side. The table 110 may be extended as shown to an upward and rearward use position as shown in FIG. 7D or stowed within the recessed area 124 when the extended position is not needed.

Figure 8:
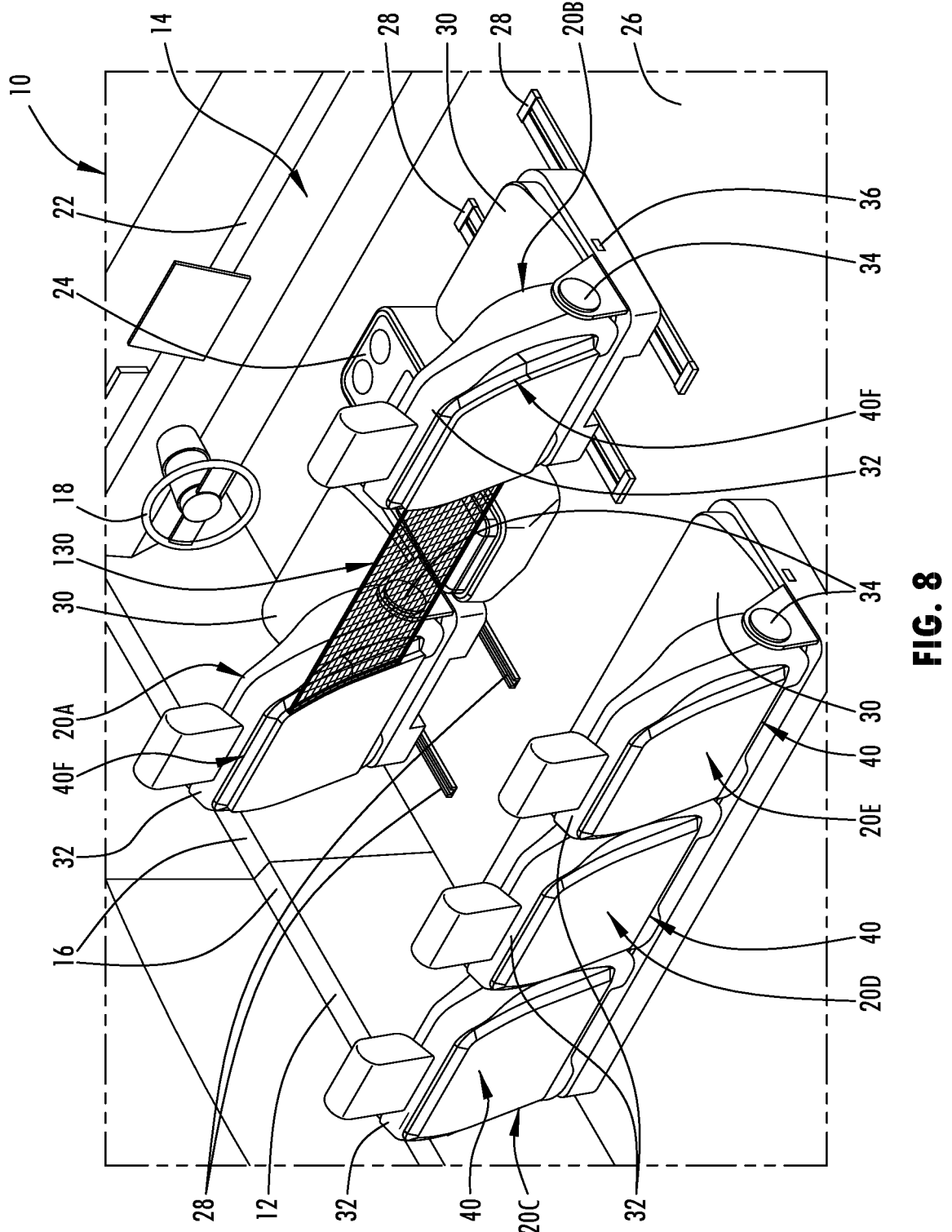
FIG. 8 is a rear perspective view of a cabin interior of the vehicle illustrating a pet divider accessory connected to the seat back of each of the front two seating assemblies, according to a further example.

Referring to FIG. 8, a sixth accessory in the form of a pet divider accessory 40F is shown installed on each of the front first and second seating assemblies 20A and 20B. The pet divider accessory 40F generally includes a divider 130 that connects between the pet divider accessories 40F on each of the first and second seating assemblies 20A and 20B. In the example shown, the divider 130 may be a net. It should be appreciated that other divider materials may be provided such as a panel. It should be further appreciated that the divider 130 may be initially attached to one of the pet divider accessories 40F and then may be attachably connected to the other of the pet divider accessories 40F to form the extended divider wall.

Figure 9A:
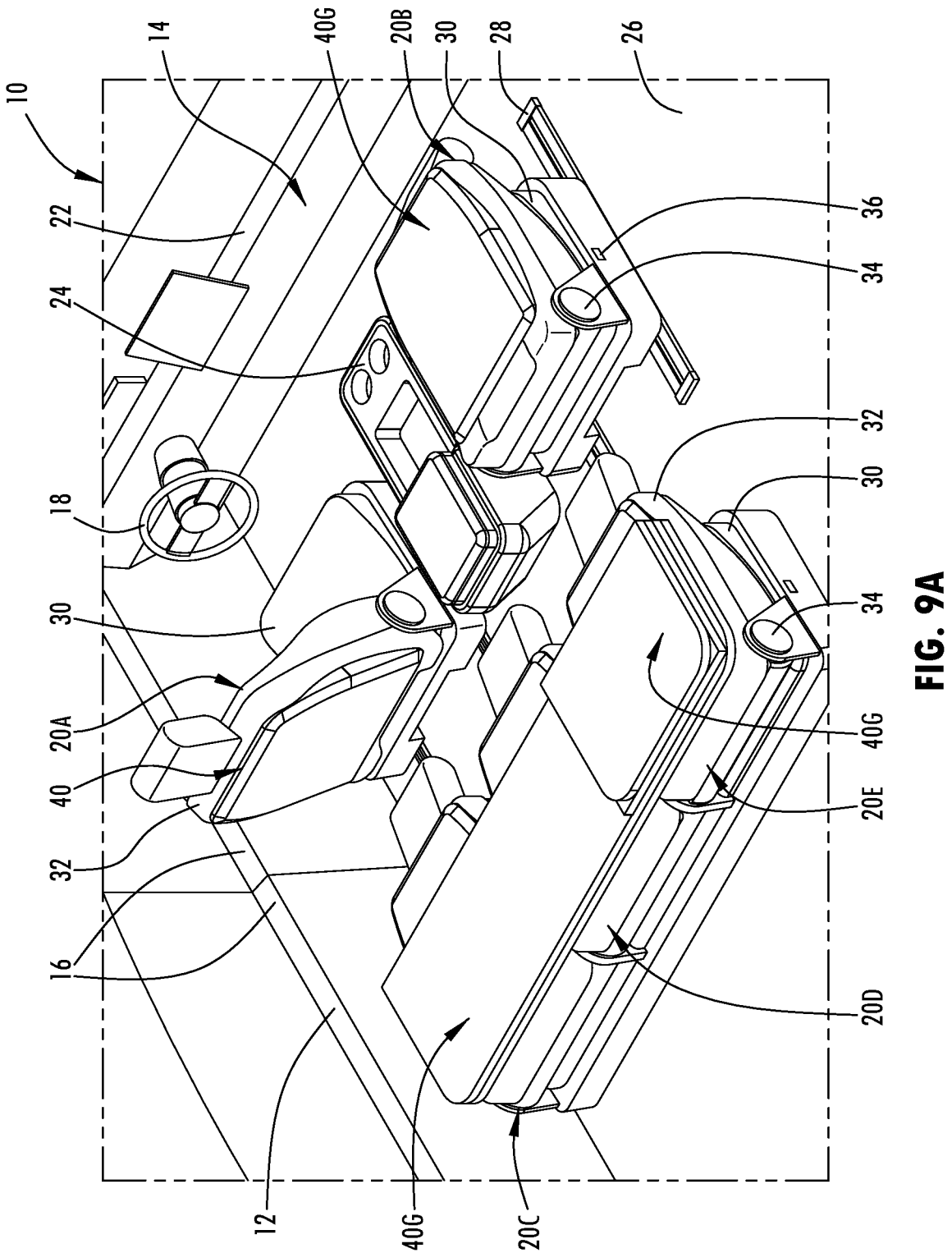
FIG. 9A is a rear perspective view of the cabin interior of the vehicle further illustrating a foldout table cargo accessory connected to the back side of certain seating assemblies.
Figure 9B:
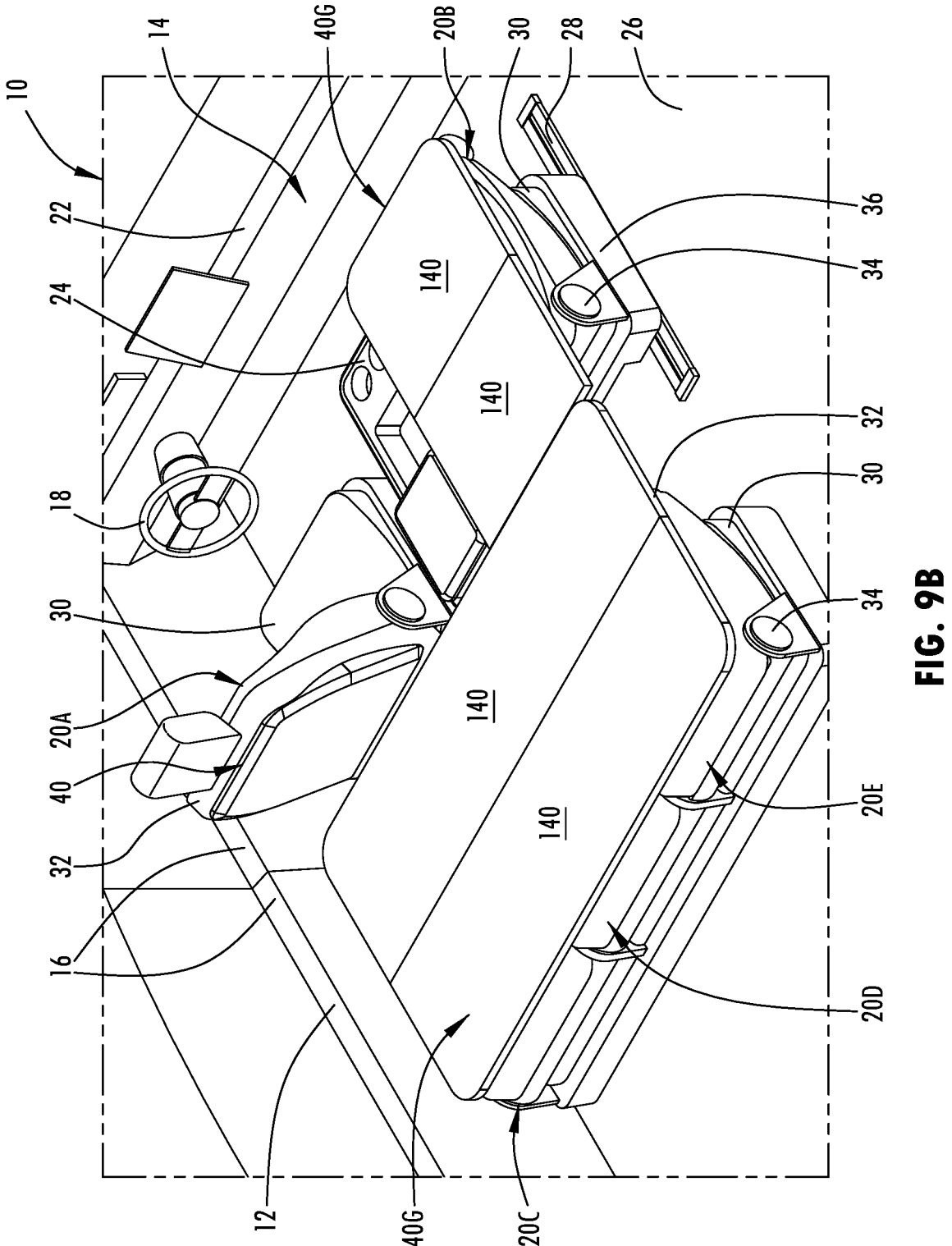
FIG. 9B is a rear perspective view of the cabin interior of the vehicle shown in FIG. 9A with the foldout table accessory in a deployed position.

Referring to FIGS. 9A and 9B, a seventh accessory in the form of a foldable and extendable flat surface accessory 40G is shown provided on each of a plurality of the seating assemblies 20A-20E. The foldable and extendable flat surface accessory 40G is shown installed on the second seating assembly 20B having a pair of foldout panels 140. Similarly, a foldout flat surface accessory 40G is provided that extends across the seat back 32 of all of the rear rows of seating assemblies 20C-20E and includes a pair of foldout panels 140. The first seating assembly 20A is also shown having the foldable and extendable flat surface accessory 40G; however, it may only be used when the motor vehicle 10 is not driven by a driver. When one or more of the panels 140 are folded out, the panels 140 may form an extended bed or table surface. By folding the panels 140 to an extended position, a substantial surface will be provided within the vehicle cabin. It should be appreciated that the panels 140 may include interconnecting hinges to allow the panels 140 to fold and unfold.

Figure 10B:
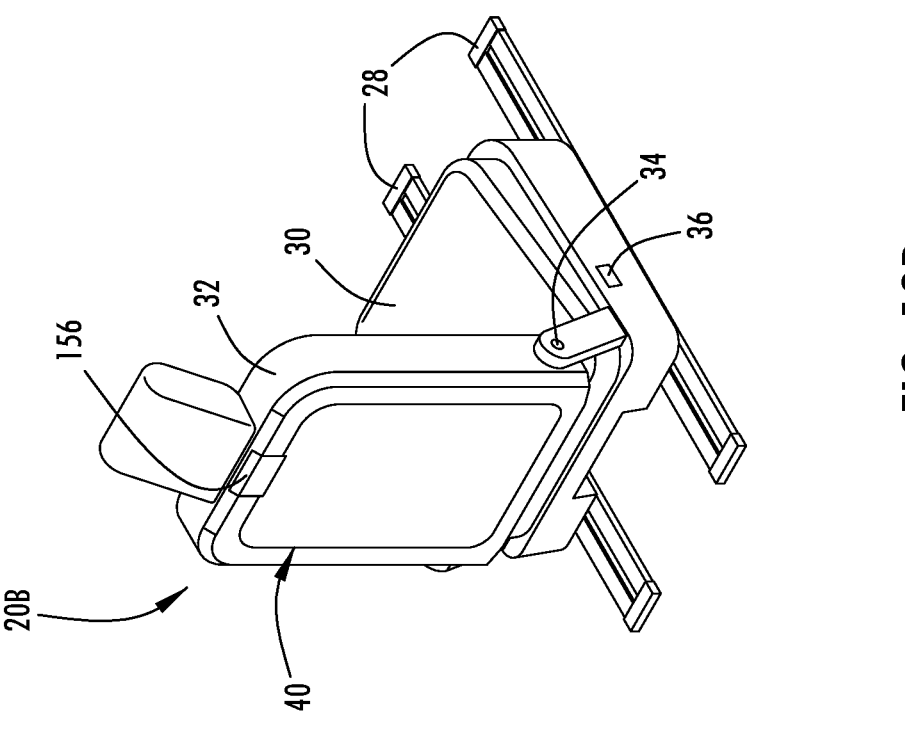
FIG. 10B is a rear perspective view of the seating assembly shown in FIG. 10A with the accessory connected to the seat back.
Figure 10A:
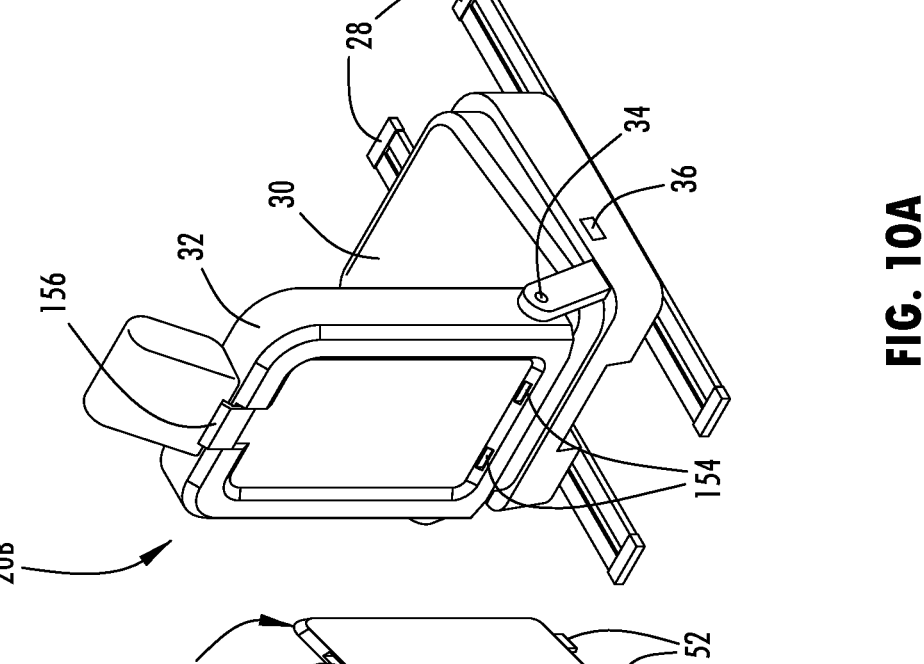
FIG. 10A is a rear perspective view of the seating assembly in a seating position with an accessory positioned to be attached to a rear of the seat back according to a toe-in and slide lock connection, according to a second embodiment.

Referring to FIGS. 10A and 10B, a vehicle seating assembly 20B is shown having a second connector assembly, according to a second embodiment. In this embodiment, the accessory 40 is configured to connect to the rear side of the seat back 32 via first and second toe-in connectors 152 that are configured with tenon teeth of a tenon geometry to insert into corresponding first and second slots 154 which have a mortise mating feature in a lower portion of the seat back. A top end of the accessory 40 has an angled surface configured with an engagement element 150 such as a slot to be received and engaged by a latch 156 of the upper portion of the seat back 32. As such, first and second toe-in members 152 may be inserted into the first and second slots 154 and the upper end of the accessory 40 is rotated towards the seat back 32 and pushed into position to matingly engage the engagement element 150 with the latch 156 to lock it in place. To remove the accessory 40 from the seat back 32, the latch 156 may be raised to disengage from the engagement element 150 and the accessory 40 may be pivoted outward from the latch 156 and raised and removed from the seat back 32.

Figure 11B:
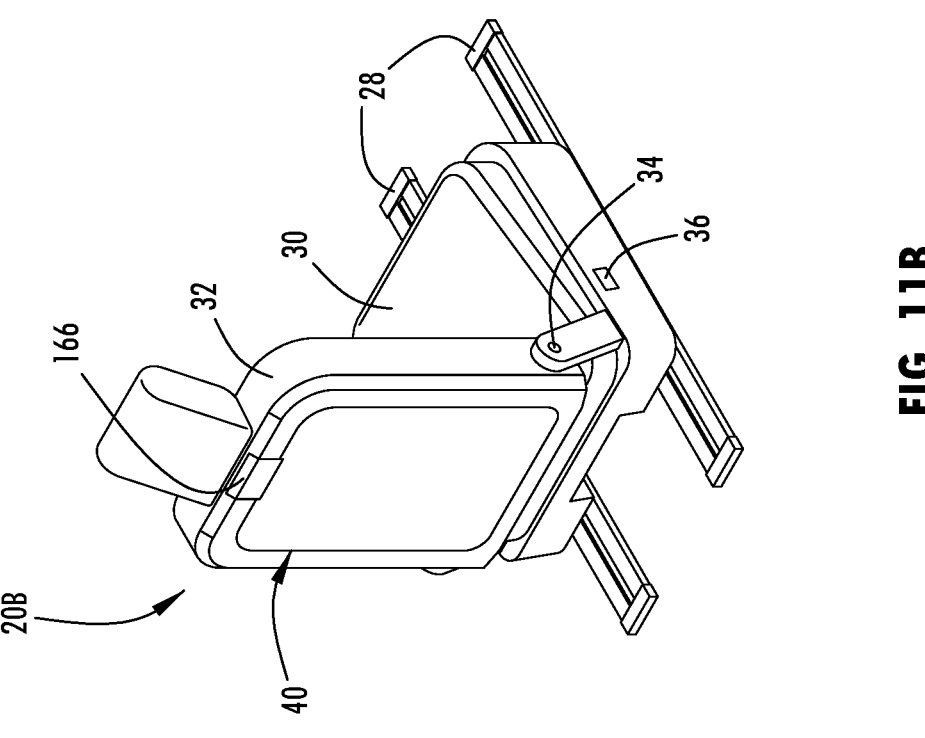
FIG. 11B is a rear perspective view of the seating assembly shown in FIG. 11A with the accessory connected to the seat back.
Figure 11A:
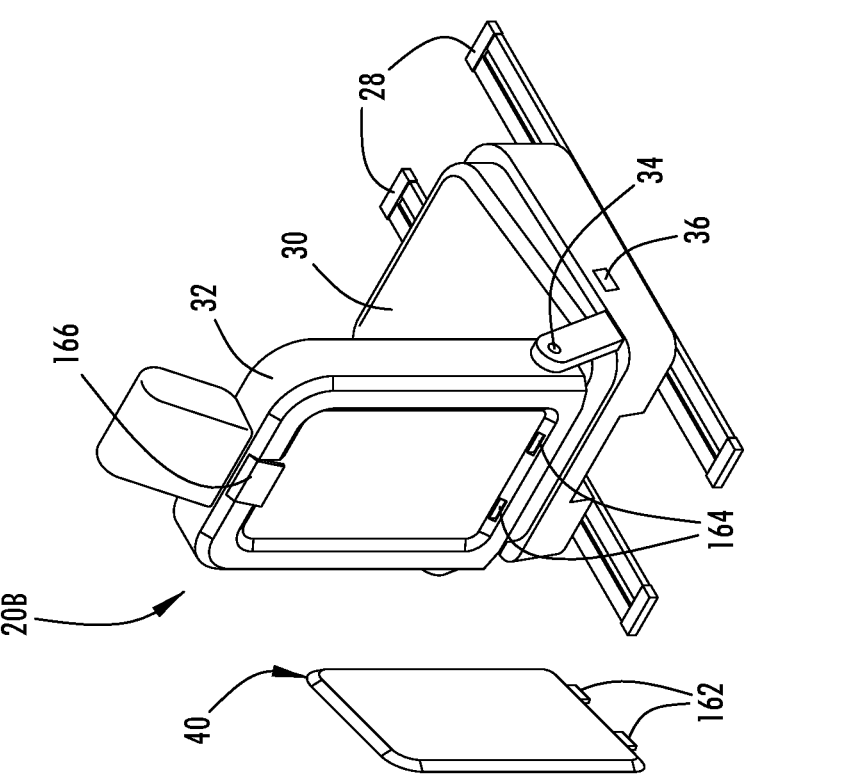
FIG. 11A is a rear perspective view of the seating assembly in a seating position with an accessory positioned to be connected to the seat back, according to a third embodiment.
Figure 11A:

Referring to FIGS. 11A and 11B, a seating assembly 20B is illustrated having an accessory 40 connected to the seat back 32 via a toe-in and latch connection assembly, according to a third embodiment. In this embodiment, the accessory 40 includes first and second toe-in members 162 tenon teeth extending downward from the bottom end and configured to engage a pair of slots 164 with mortise mating features in the lower end of the seat back 32. The upper end of the accessory 40 has an angled surface that engages a latch 166 so as to clip to lock the accessory 40 into place on the seat back 32. The accessory 40 may be removed from the seat back 32 by pulling on the latch 166 to release the upper end of the accessory 40 and raise and remove the accessory 40 from the seat back 32.

Figure 12B:
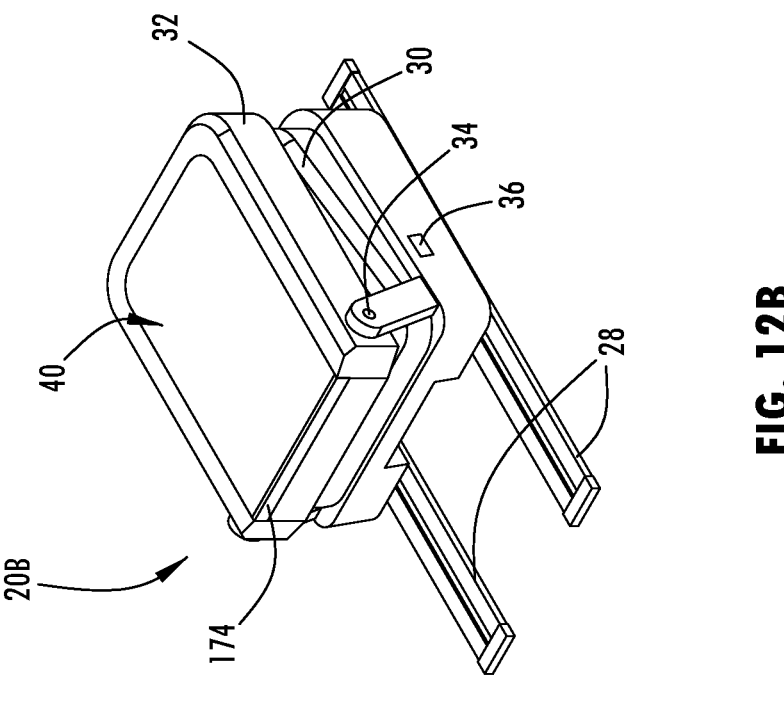
FIG. 12B is a rear perspective view of the seating assembly shown in FIG. 12A with the accessory connected to the seat back.
Figure 12A:
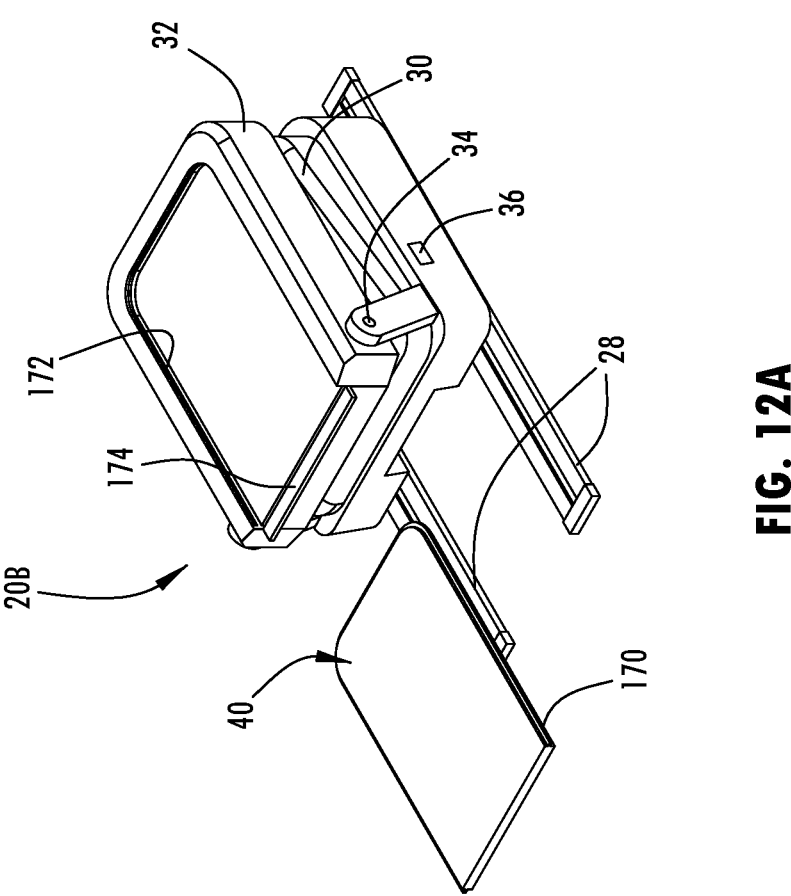
FIG. 12A is a rear perspective view of the seating assembly in a folded position with an accessory to be connected to the seat back with a slide-in and lock connection, according to a fourth embodiment.

Referring to FIGS. 12A and 12B, a vehicle seating assembly 20B is illustrated having an accessory 40 connected to the rear side of the seat back 32, according to a fourth embodiment. In this embodiment, a slide-in and lock connector arrangement is employed. The accessory 40 is shown having a mating dovetailed surface 170 extending around the edge on a periphery of the accessory 40. The mating dovetailed surface 170 is configured to engage a dovetailed geometry lock channel 172 provided in the rear surface of the seat back 32. The accessory 40 slides within the lock channel 172 to a fully engaged position upon which a clip lock latch 174 may lock the accessory 40 in position. To remove the accessory 40 from the seat back 32, the clip lock latch 174 may be raised to release the end with accessory 40 and allow the accessory 40 to slide out and be removed from the seat back 32.

Accordingly, a vehicle seating assembly 20B is provided with a modular seat back 32 that allows for use of multiple accessories 40 on the rear side of a seat back 32. The accessories 40 may be easily installed onto the seat back 32 and removed and replaced with other accessories.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising: a seat base; a seat back; an articulation mechanism coupled to the seat base and seat back to allow the seat back to move between an upright seating position and a folded position; a back panel provided on the seat back; an accessory attachment system located on the back panel and having one or more alignment connector structures, including first and second slots, first and second toe-in alignment arms, first and second latches and first and second strikers; and an accessory configured to connect onto the back panel and engage the one or more alignment connector structures, wherein the first and second latches are configured to engage first and second strikers, and the accessory is attached to the back panel, such that first and second toe-in alignment arms are inserted at an angle and the accessory is rotated such that the first and second latches engage the first and second strikers to retain the accessory on the back panel, and wherein the first and second toe-in alignment arms are located on the accessory and configured to engage the first and second slots located on the back panel.

2. The vehicle seating assembly of claim 1, wherein the seating assembly is a passenger seating assembly.

3. The vehicle seating assembly of claim 1, wherein the accessory comprises a deployable crate.

4. The vehicle seating assembly of claim 1, wherein the accessory comprises a changing table.

5. The vehicle seating assembly of claim 1, wherein the accessory comprises a deployable table assembly.

6. The vehicle seating assembly of claim 1, wherein the accessory comprises a media accessory.

7. The vehicle seating assembly of claim 1, wherein the accessory comprises one of a cargo and playzone accessory.

8. The vehicle seating assembly of claim 1, wherein the accessory comprises a pet divider.

9. A vehicle seating assembly comprising: a seat base; a seat back; an articulation mechanism coupled to the seat base and seat back to allow the seat back to move between an upright seating position and a folded position; a back panel provided on the seat back; an accessory attachment system located on the back panel and having one or more alignment connector structures, including first and second toe-in alignment arms configured to engage first and second slots, and first and second latches configured to engage first and second strikers; and an accessory configured to connect onto the back panel and engage the one or more alignment connector structures, wherein one of the back panel and the accessory has the first and second latches and the other of the back panel and the accessory has the first and second strikers, wherein the accessory is attached to the back panel, such that the one or more toe-in alignment arms are inserted at an angle and the accessory is rotated such that the first and second latches engage the first and second strikers to retain the accessory on the back panel, and wherein the first and second toe-in alignment arms are located on the accessory, and the first and second slots located on the back panel.

10. The vehicle seating assembly of claim 9, wherein the accessory comprises a deployable crate.

11. The vehicle seating assembly of claim 9, wherein the accessory comprises a changing table.

12. The vehicle seating assembly of claim 9, wherein the accessory comprises a deployable table assembly.

13. The vehicle seating assembly of claim 9, wherein the accessory comprises a media accessory.

14. The vehicle seating assembly of claim 9, wherein the accessory comprises one of a cargo and playzone accessory.

15. The vehicle seating assembly of claim 9, wherein the accessory comprises a pet divider.

* * * * *